(12) United States Patent
Sharma

(10) Patent No.: US 10,134,020 B2
(45) Date of Patent: Nov. 20, 2018

(54) ADDING SUPPLEMENTAL DATA TO DATA SIGNALS TO ENHANCE LOCATION DETERMINATION

(71) Applicant: MasterCard International Incorporated, Purchase, NY (US)

(72) Inventor: Aarti Sharma, Saint Charles, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 519 days.

(21) Appl. No.: 14/831,336

(22) Filed: Aug. 20, 2015

(65) Prior Publication Data

US 2017/0053251 A1   Feb. 23, 2017

(51) Int. Cl.
| | |
|---|---|
| *G06Q 20/00* | (2012.01) |
| *G06Q 20/32* | (2012.01) |
| *G06Q 40/00* | (2012.01) |
| *G06F 21/00* | (2013.01) |
| *G06F 7/00* | (2006.01) |
| *G06Q 20/10* | (2012.01) |
| *G07F 19/00* | (2006.01) |
| *G06Q 20/40* | (2012.01) |

(52) U.S. Cl.
CPC ..... *G06Q 20/1085* (2013.01); *G06Q 20/4014* (2013.01); *G07F 19/211* (2013.01)

(58) Field of Classification Search
CPC ........ G06Q 20/00; G06Q 20/32; G06Q 40/00; G06F 21/00; G06F 7/00
USPC ............................................. 705/43
See application file for complete search history.

(56) References Cited

U.S. PATENT DOCUMENTS

| | | | |
|---|---|---|---|
| 6,081,792 A | 6/2000 | Cucinotta et al. | |
| 7,621,443 B2 | 11/2009 | Keohane et al. | |
| 7,992,777 B1 | 8/2011 | Block et al. | |
| 8,423,465 B1 | 4/2013 | McGraw, IV et al. | |
| 8,707,319 B2 * | 4/2014 | Nguyen ................. | G06Q 20/32 705/43 |
| 8,892,736 B2 | 11/2014 | Stewart | |
| 2003/0033249 A1 | 2/2003 | Ingram et al. | |
| 2004/0215566 A1 | 10/2004 | Meurer | |
| 2005/0094564 A1 | 5/2005 | Huang | |
| 2010/0114677 A1 | 5/2010 | Carlson et al. | |
| 2014/0279490 A1 | 9/2014 | Calman et al. | |

OTHER PUBLICATIONS

International Search Report and Written Opinion, Application No. PCT/US2016/047000, dated Nov. 15, 2016, 8 pps.

* cited by examiner

*Primary Examiner* — Clifford B Madamba
(74) *Attorney, Agent, or Firm* — Armstrong Teasdale LLP

(57) ABSTRACT

A data signal enhancement device for adding supplemental location data to a data signal to enhance location determination is described. Additionally, a method and a computer-readable storage medium for adding supplemental location data to a data signal to enhance location determination is described.

20 Claims, 11 Drawing Sheets

ADDING SUPPLEMENTAL DATA TO DATA SIGNALS TO ENHANCE LOCATION DETERMINATION

BACKGROUND

This disclosure relates to processing electronic signals transmitted through computer networks, and more specifically to adding supplemental data to data signals to enhance location determinations.

While automated teller machines (ATMs) are distributed throughout cities, such as in gas stations, restaurants, and other merchant locations, issuing banks and payment processing networks do not correlate the locations of the ATMs with the locations of the merchants. While a conventional ATM transmits electronic data signals through a payment network and includes an address of where the ATM is located in the data signals, the data signals do not identify the merchant that houses the ATM. Accordingly, in conventional systems, issuing banks and payment processing networks do not readily have information regarding the identities of the merchants housing the ATMs. Without the ability to correlate merchants with ATMs, an issuing bank may have difficulty directing cardholders towards particular merchant locations to use the issuing bank's ATMs. Accordingly, during sporting events or other occurrences that bring an influx of people into an area they are not familiar with, the issuing bank potentially misses the opportunity to jointly advertise with the merchants who house their ATMs to direct the people to their ATMs.

BRIEF DESCRIPTION OF THE DISCLOSURE

In one aspect, a data signal enhancement device for adding supplemental location data to a data signal to enhance location determination is provided. The data signal enhancement device includes a processor coupled to a memory device. The data signal enhancement device is coupled to a processing network. Further, the data signal enhancement device is configured to detect transaction data associated with a first merchant in a first data signal. The transaction data includes a merchant name and a merchant address for the first merchant. Additionally, the data signal enhancement device is configured to detect automated teller machine (ATM) data associated with a first ATM in a second data signal. The ATM data includes an ATM address for the first ATM. Additionally, the data signal enhancement device is configured to determine that the ATM address is similar to the merchant address. The data signal enhancement device is further configured to generate an indicator that the first ATM is located at the first merchant, and generate an enhanced data signal that is based on the first data signal and the second data signal and includes the indicator. Additionally, the data signal enhancement device is configured to transmit the enhanced data signal to a computing device of an issuing bank.

In another aspect, a method for adding supplemental location data to a data signal to enhance location determination is provided. The method is implemented by a data signal enhancement device coupled to a memory and to a processing network. The method includes detecting, by the data signal enhancement device, transaction data associated with a first merchant in a first data signal. The transaction data includes a merchant name and a merchant address for the first merchant. Additionally, the method includes detecting, by the data signal enhancement device, automated teller machine (ATM) data associated with a first ATM in a second data signal. The ATM data includes an ATM address for the first ATM. Additionally, the method includes determining, by the data signal enhancement device, that the ATM address is similar to the merchant address. Further, the method includes generating an indicator that the first ATM is located at the first merchant. Additionally, the method includes generating, by the data signal enhancement device, an enhanced data signal that is based on the first data signal and the second data signal and includes the indicator. The method also includes transmitting, by the data signal enhancement device, the enhanced data signal to a computing device of an issuing bank.

In yet another aspect, a computer-readable storage medium having computer-executable instructions embodied thereon is provided. When executed by a one or more processors of a data signal enhancement device coupled to a memory and to a processing network, the computer-executable instructions cause the data signal enhancement device to detect transaction data associated with a first merchant in a first data signal. The transaction data includes a merchant name and a merchant address for the first merchant. Additionally, the instructions cause the data signal enhancement device to detect automated teller machine (ATM) data associated with a first ATM in a second data signal. The ATM data includes an ATM address for the first ATM. Additionally, the instructions cause the data signal enhancement device to determine that the ATM address is similar to the merchant address. Additionally, the instructions cause the data signal enhancement device to generate an indicator that the first ATM is located at the first merchant. The instructions also cause the data signal enhancement device to generate an enhanced data signal that is based on the first data signal and the second data signal and includes the indicator, and transmit the enhanced data signal to a computing device of an issuing bank.

BRIEF DESCRIPTION OF THE DRAWINGS

FIG. 1 is a schematic diagram illustrating an enhanced multi-party payment card industry system for enabling payment-by-card transactions in which merchants and card issuers do not necessarily have a one-to-one relationship, and for transmitting an enhanced data signal to an issuer indicating that a particular automated teller machine (ATM) is located at a particular merchant location.

FIG. 2 is a simplified block diagram of an example payment processing system including a payment processing server computing device, a data signal enhancement device, and a plurality of computing devices in accordance with one example embodiment of the present disclosure.

FIG. 3 is an expanded block diagram of a server architecture of the payment processing system including the plurality of computing devices in accordance with one example embodiment of the present disclosure.

FIG. 4 illustrates a configuration of a client system shown in FIGS. 2 and 3 in accordance with one example embodiment of the present disclosure.

FIG. 5 illustrates a configuration of a server system shown in FIGS. 2 and 3 in accordance with one example embodiment of the present disclosure.

FIG. 6 is a diagram of a geographic area that includes a plurality of merchant locations and ATMs located at the merchant locations.

FIG. 7 is a diagram of electronic data signals received and transmitted in an environment in which the data signal enhancement device operates.

FIG. 8 is a diagram of an indicator generated by the data signal enhancement device, indicating that particular merchant locations include particular ATMs.

FIG. 9 is a diagram of a message signal transmitted from a message distributor to a plurality of cardholders based at least in part on the indicator generated by the data signal enhancement device.

FIG. 10 is a flowchart of an example process implemented by the data signal enhancement device for enhancing data detected in a first data signal and a second data signal in one example embodiment of the present disclosure.

FIG. 11 is a diagram of components of one or more example computing devices that may be used in the system shown in FIG. 2.

DETAILED DESCRIPTION OF THE DISCLOSURE

Figure 1:
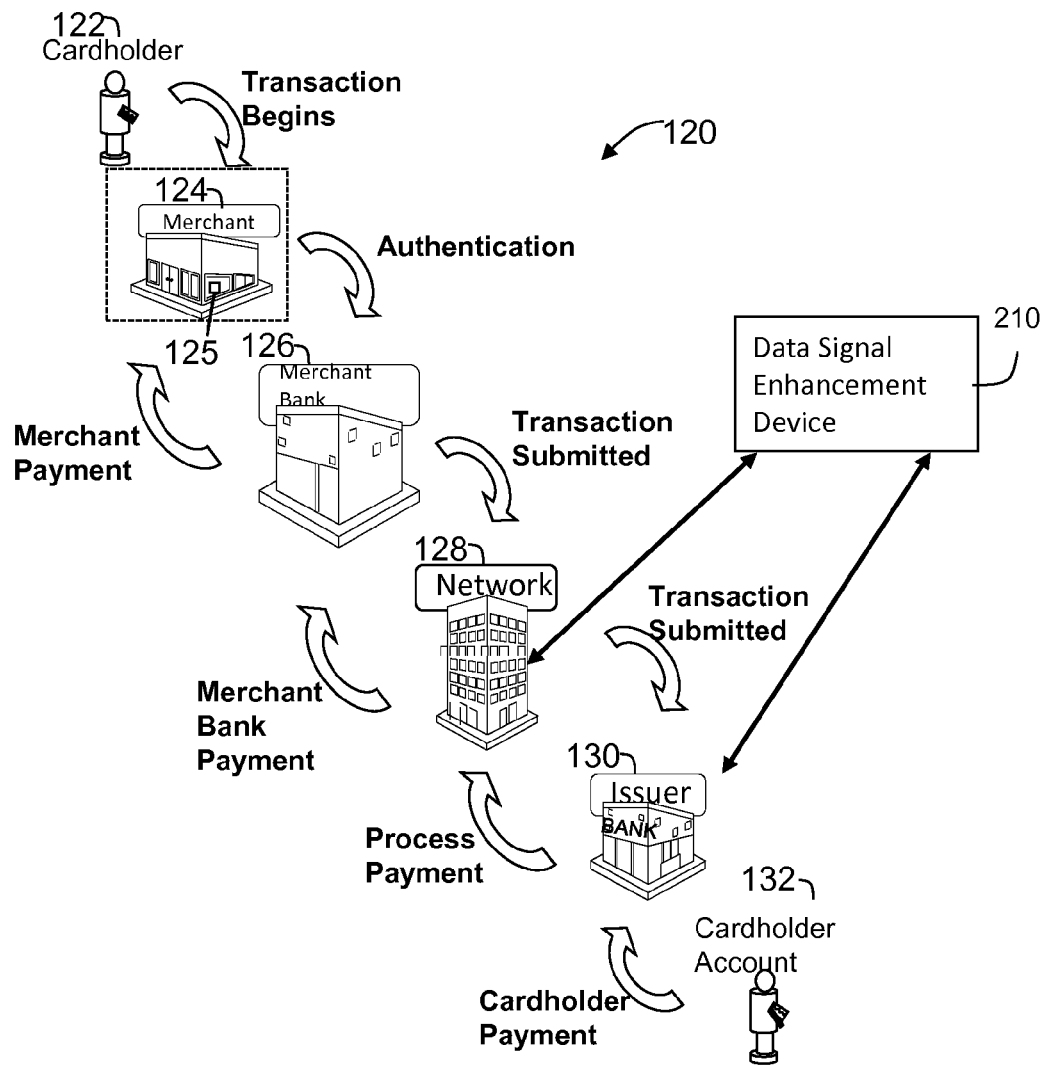
FIGS. 1-11 show example embodiments of the methods and systems described herein.

A data signal enhancement device for adding supplemental location data to a data signal is provided. The data signal enhancement device includes a processor coupled to a memory device. The data signal enhancement device is coupled to a payment network. The data signal enhancement device is configured to receive merchant transaction data associated with a first merchant. The merchant transaction data includes a merchant name and a merchant address (e.g., street address) for the first merchant. Additionally, the data signal enhancement device receives automated teller machine (ATM) data associated with a first ATM. The ATM data includes an ATM address for the first ATM. Additionally, the data signal enhancement device determines that the ATM address matches the merchant address, and stores an indicator in the memory device that the first ATM is located at the first merchant, based on the determination that the ATM address matches the merchant address.

In some embodiments, the data signal enhancement device is configured to transmit the merchant name and merchant address in association with an identifier of the first ATM to a computing device of an issuing bank associated with the first ATM, thereby informing the issuing bank of the identity of the merchant that houses the first ATM. In some embodiments, the data signal enhancement device is further configured to receive the merchant transaction data in an authorization request message that was generated by a computing device associated with the first merchant, and received at the payment network. Additionally, in some embodiments, the data signal enhancement device is further configured such that receiving the merchant transaction data includes receiving the merchant address in a first format (e.g., 7700 Forsyth Blvd., St. Louis, Mo.), and receiving the ATM data includes receiving the ATM address in a second format (7700 Forsyth Boulevard, St. Louis, Mo., 63105) that is different from the first format. Accordingly, the data signal enhancement device matches the merchant address with the ATM address despite the formatting differences in the addresses.

In some embodiments, the data signal enhancement device is further configured to enhance the merchant transaction data by inserting the ATM address into a cleanse field of the merchant transaction data, wherein the merchant address is in a first format and the ATM address is in a second format that is different from the first format. Accordingly, the data signal enhancement device, in these embodiments, makes the address information from merchant transactions consistent with the address information from ATM transactions originating from the merchant location. Additionally, in some implementations, the data signal enhancement device is further configured to receive the ATM address from a computing device associated with an issuing bank, for example in a listing of ATM identifiers and addresses. In some implementations, the data signal enhancement device is further configured to receive the ATM address from a transaction initiated at the first ATM (e.g., a cash withdrawal).

The methods and systems described herein may be implemented using computer programming or engineering techniques including computer software, firmware, hardware or any combination or subset thereof, wherein the technical effect is achieved by performing at least one of: (a) detecting transaction data associated with a first merchant in a first data signal, the transaction data including a merchant name and a merchant address for the first merchant; (b) detecting automated teller machine (ATM) data associated with a first ATM in a second data signal, the ATM data including an ATM address for the first ATM; (c) determining that the ATM address is similar to the merchant address; (d) generating an indicator that the first ATM is located at the first merchant; and (e) transmitting, to a computing device of an issuing bank, an enhanced data signal based on the first signal and the second signal, wherein the enhanced data signal includes the indicator. The technical effects described herein apply to the technical field of processing electronic data signals transmitted through a computer network and enhancing data in the electronic data signals. The systems and methods described herein provide the technical advantage of correlating data from two separate signals and indicating the correlation in an indicator that is stored in memory used by a payment card payment processing network, thereby enhancing the processing of data through the payment network.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an enhanced multi-party payment card system 120 for enabling payment-by-card transactions in which merchants and card issuers do not necessarily have a one-to-one relationship and for transmitting an enhanced data signal to an issuer indicating that a particular automated teller machine (ATM) is located at a particular merchant location. The present disclosure relates to an enhancement of a payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 120, a financial institution such as an issuer 130 issues a payment account card, such as a credit card account or a debit card account, to a cardholder 122, who uses the payment account card to tender payment for a purchase from a merchant 124. To accept payment with the payment account card, merchant 124 must normally establish an account with a financial institution that is part of the financial payment system. This financial institution is usually called the "merchant bank" or the "acquiring bank" or "acquirer bank" or simply "acquirer". When a cardholder 122 tenders payment for a purchase with a payment account card (also known as a financial transaction card), merchant 124 requests authorization from acquirer 126 for the amount of the purchase. The request may be performed over the telephone, but is usually performed through the use of a point-of-interaction terminal, which reads the cardholder's account information from the magnetic stripe on the payment account card or EMV chip and communicates electronically with the transaction processing computers of acquirer 126. Alternatively, acquirer 126 may authorize a third party to perform transaction processing on its behalf. In this case, the point-of-interaction terminal will be configured to communicate with the third party. Such a third party is usually called a "merchant processor" or an "acquiring processor." In some instances, a merchant (e.g., merchant 124) stores payment card information associated with a cardholder (e.g., cardholder 122) and requests authorization from acquirer 126 using the stored payment card information, rather than reading the cardholder's account information from the payment card itself (i.e., a card-on-file (COF) transaction).

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For PIN debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is cleared and settled between merchant 124, acquirer 126, and issuer 130. Clearing refers to the communication of financial data for reconciliation purposes between the parties. Settlement refers to the transfer of funds between the merchant's account, acquirer 126, and issuer 130 related to the transaction.

In some implementations, an automated teller machine (ATM) 125 is located at the location of merchant 124. ATM 125 transmits messages through payment card system payment network 128 in a process similar to the process described above to enable a cardholder to withdraw funds from, deposit funds to, and/or check the balance of cardholder account 132. As described in more detail herein, one or more computer systems of payment card system payment network 128 transmits electronic data signals to data signal enhancement device 210. The computer systems of payment card system payment network 128 transmit at least two types of electronic data signals to data signal enhancement device 210. The first type of signal includes an identifier and location of merchant 124, wherein the location is specified in a first format. The second type of signal includes an identifier and a location of ATM 125, wherein the location of the ATM 125 is specified in a second format that is different from the first format. Data signal enhancement device 210 determines that the ATM 125 is collocated with the merchant, for example by matching the location of merchant 124 specified in the first format with the location of the ATM 125 specified in the second format. More specifically, in at least some implementations, data signal enhancement device applies fuzzy logic to determine similarities in the two locations specified in the two formats and determines that they are the same location. In at least some implementations, data signal enhancement device 210 generates an indicator that indicates that the ATM 125 is located with the merchant 124. Further, in some implementations, data signal enhancement device 210 transmits an enhanced data signal to issuer 130 including the indicator.

Figure 2:
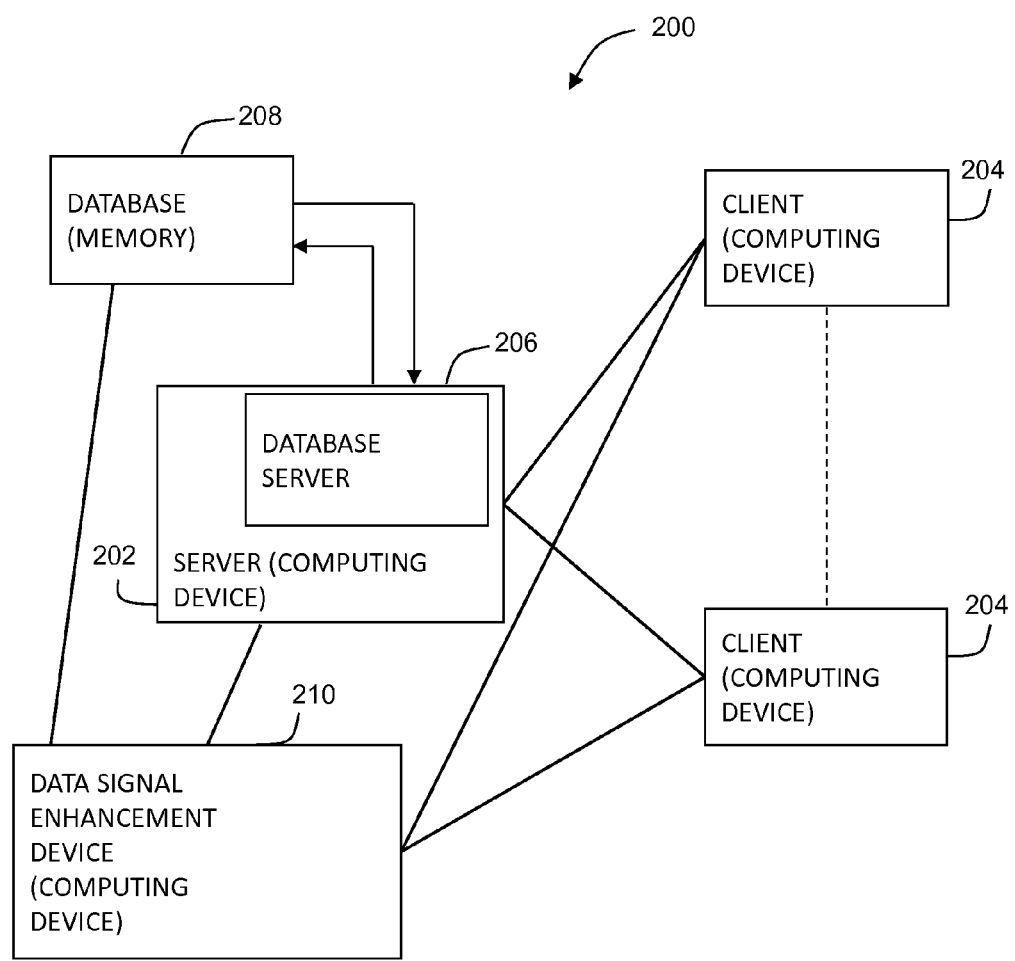

FIG. 2 is a simplified block diagram of an example payment processing system 200 in accordance with one embodiment of the present disclosure. In the example embodiment, system 200 includes a payment processing server computing device 202, a plurality of client subsystems, also referred to as client systems 204 or client computing devices, connected to payment processing server computing device 202, and a data signal enhancement device 210. As described in more detail with reference to FIG. 3, client systems 204 include computer systems of ATMs (e.g., ATM 125), computer systems of merchants (e.g., merchant 124), computer systems of acquirers (e.g., acquirer 126), and computer systems of one or more issuers (e.g., issuer 130). In one embodiment, client systems 204 are computers including a web browser, such that payment processing server computing device 202 and/or data signal enhancement device 210 are accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a mobile computing device, such as a notebook computer, a web-based phone, a personal digital assistant (PDA), or other web-connectable equipment.

In one embodiment, client computing device 204 includes a point-of-sale (POS) device, a cardholder computing device (e.g., a smartphone, a tablet, or other computing device), or any other computing device capable of communicating with payment processing server computing device 202. A database server 206 is connected to a database 208 containing information on a variety of matters, as described below in greater detail. In one embodiment database 208 is stored on payment processing server computing device 202 and may be accessed by potential users at one of client systems 204 by logging onto payment processing server computing device 202 through one of client systems 204. In any alternative embodiment, database 208 is stored remotely from payment processing server computing device 202 and may be non-centralized. In at least some implementations, as described in more detail herein, data signal enhancement device 210 stores data to, and retrieves data from, database 208.

Figure 3:
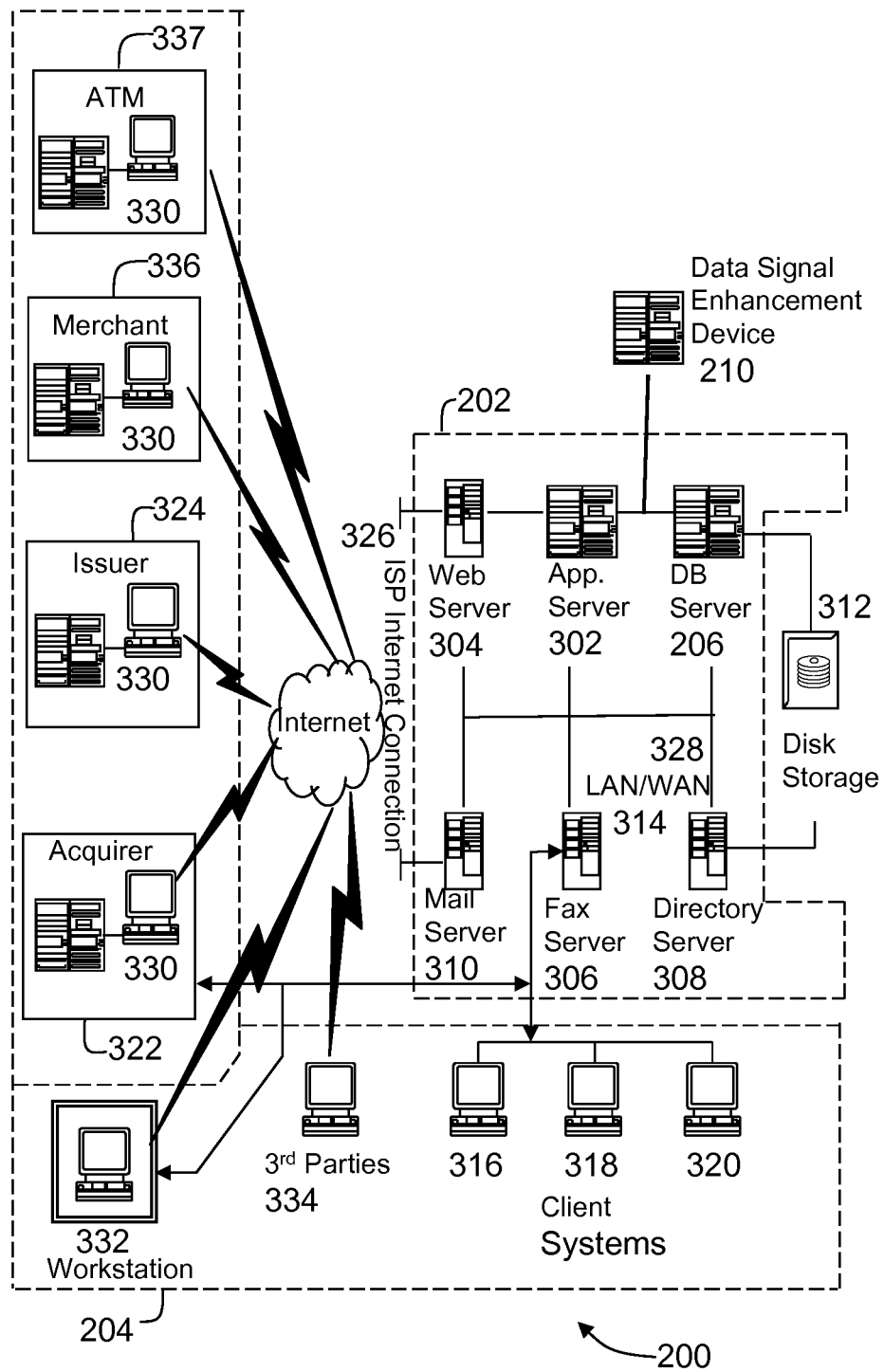

FIG. 3 is an expanded block diagram of an example embodiment of a server architecture of payment processing system 200 in accordance with one embodiment of the present disclosure. Payment processing system 200 includes payment processing server computing device 202, client systems 204, and data signal enhancement device 210. Payment processing server computing device 202 includes database server 206, an application server 302, a web server 304, a fax server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet. In some implementations, data signal enhancement device 210 is remote from payment processing server computing device 202 but communicatively coupled thereto. In other implementations, data signal enhancement device 210 is incorporated into payment processing server computing device 202.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Payment processing server computing device 202 is configured to be communicatively coupled to various entities, including acquirers 322, issuers 324, and to third parties 334 (e.g., auditors) using an Internet connection 326. Server system 202 is also communicatively coupled with one or more merchants 336 and one or more ATMs 337. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328. As described above, in some implementations, data signal enhancement device 210 is remote from payment processing server computing device 202 but communicatively coupled thereto. In other implementations, data signal enhancement device 210 is incorporated into payment processing server computing device 202.

In the example embodiment, any authorized individual or entity having a workstation 330 may access system 200. At least one of the client systems includes a manager workstation 332 located at a remote location. Workstations 330 and 332 include personal computers having a web browser. Furthermore, fax server 306 communicates with remotely located client systems, including a client system 332, using a telephone link. Fax server 306 is configured to communicate with other client systems 316, 318, and 320 as well.

Figure 4:
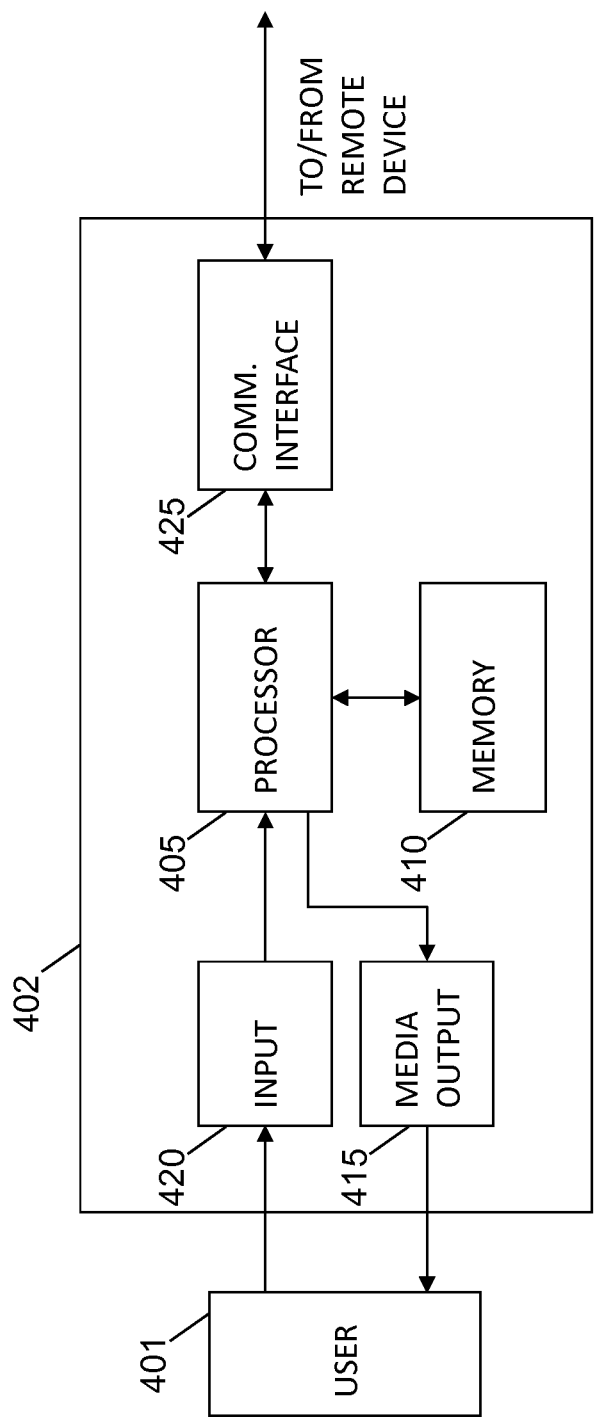

FIG. 4 illustrates an example configuration of a client computing device 402. Client computing device 402 may include, but is not limited to, client systems ("client computing devices") 204, 316, 318, 320, 330, manager workstation 332, and third party computing devices 334 (shown in FIG. 3).

Client computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 415 for presenting information to a user 401 (e.g., a cardholder 122). Media output component 415 is any component capable of conveying information to user 401. In some embodiments, media output component 415 includes an output adapter such as a video adapter and/or an audio adapter. An output adapter is operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Client computing device 402 may also include a communication interface 425, which is communicatively coupleable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website hosted by a web server (e.g., web server 304). A client application allows users 401 to interact with an application server (e.g., application server 302).

Figure 5:
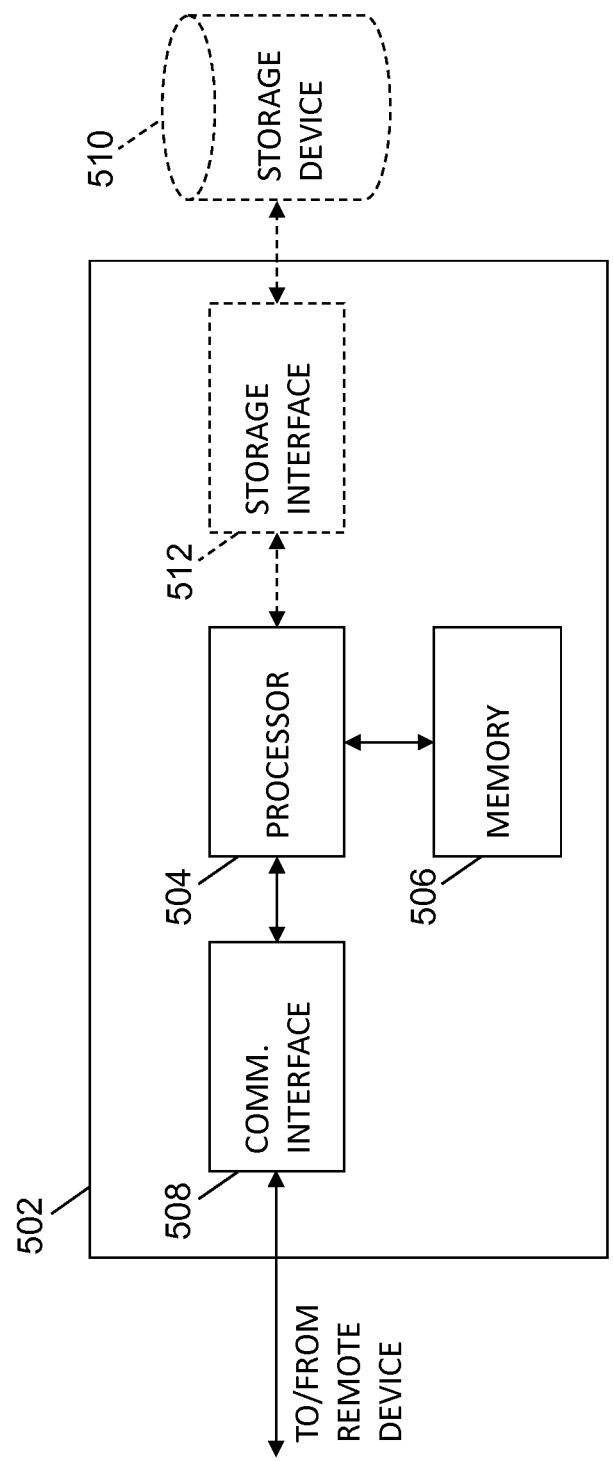

FIG. 5 illustrates an example configuration of a server computing device 502. Server computing device 502 is representative of payment processing server computing device 202 (shown in FIGS. 2 and 3), database server 206, application server 302, web server 304, fax server 306, directory server 308, mail server 310, and one or more computing devices included in data signal enhancement device 210.

Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as client computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
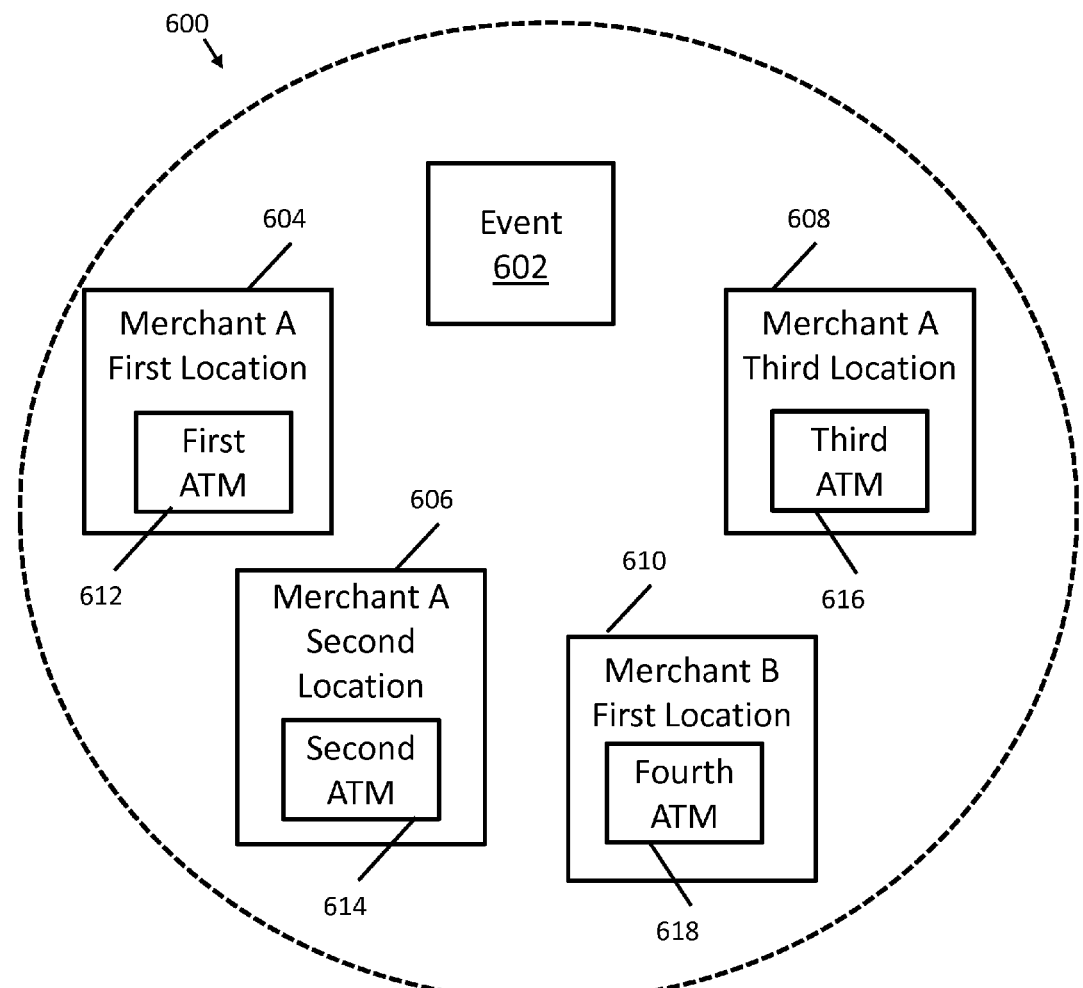

FIG. 6 is a diagram of a geographic area 600. Geographic area 600 includes a first location 604, a second location 606, and a third location 608 of a first merchant (e.g., merchant 124). A first ATM 612 is located at first location 604. More specifically first ATM 612 is housed within or otherwise located at a building of first merchant 124 at first location 604. Additionally, a second ATM 614 is located at second location 606. Similarly, a third ATM 616 is located at third location 608. Geographic area 600 additionally includes a first location 610 of a second merchant. A fourth ATM 618 is located at location 610. As described in more detail herein, data signal enhancement device 210 determines, from signals associated with ATMs and merchants, that a particular ATM is located at a particular merchant location. Accordingly, in at least some implementations, data signal enhancement device 210 transmits an enhanced data signal to an issuer 130 that owns one or more of the ATMs, indicating which merchant and merchant location each ATM is located at. Accordingly, when an event 602 is scheduled that is likely to attract cardholders from a different geographic area (e.g., a sporting event attracting cardholders 122 from another city or state) is scheduled to occur in the future, the issuer 130 may coordinate with the one or more merchants (e.g., merchant 124) housing the ATMs (e.g., ATMs 612, 614, and 616) owned by the issuer 130 to distribute messages, such as advertisements, to the cardholders 122 to direct the cardholders 122 to the merchant locations (e.g., locations 604, 606, 608). By directing the cardholders 122 to locations 604, 606, and 608, not only will the merchant 124 benefit from increased sales, the issuer 130 will also benefit from increased usage of ATMs 612, 614, and 616 at the merchant locations 604, 606, and 608. Additionally, cardholders 122 benefit by being directed to locations that sell products that the cardholders 122 are interested in purchasing and that provide convenient access to an ATM.

Figure 7:
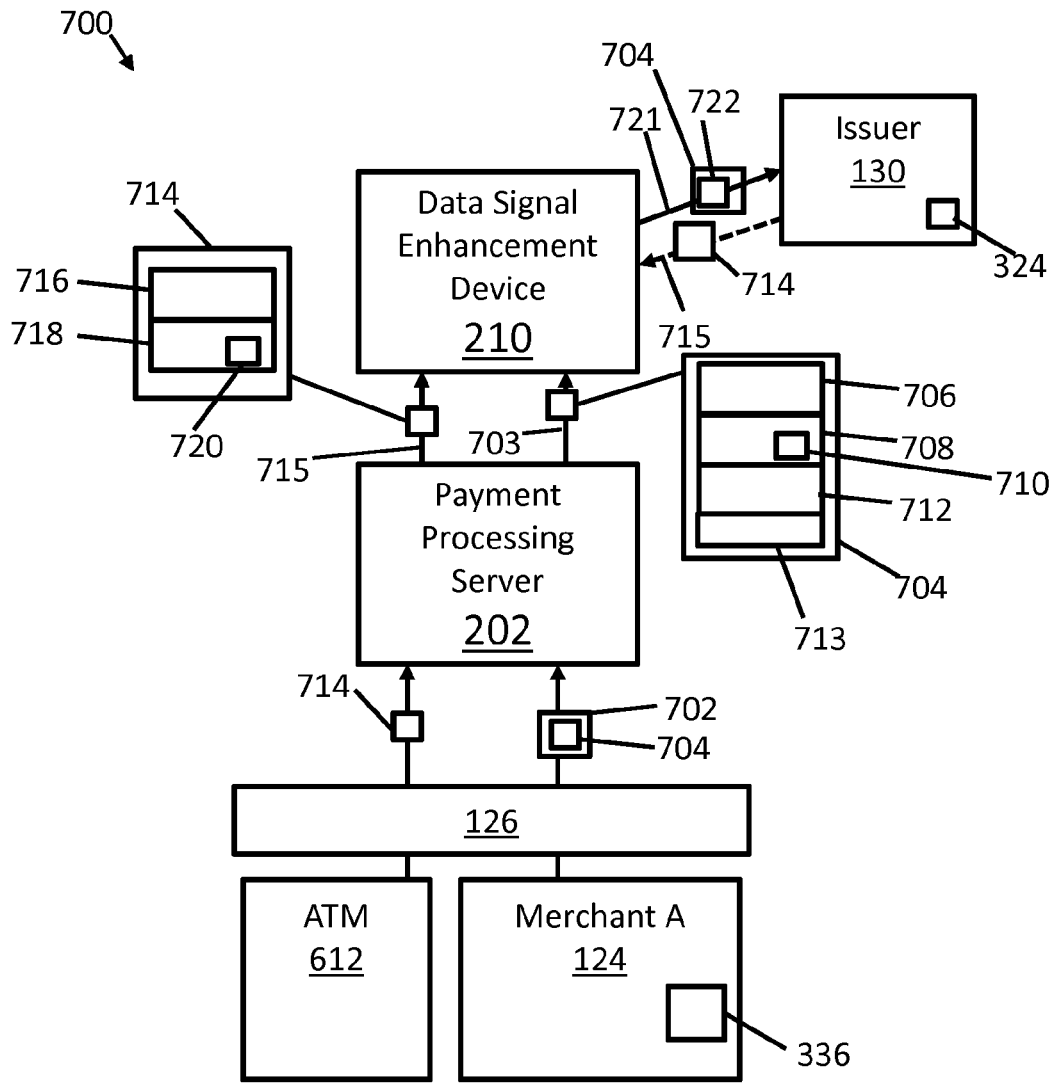

FIG. 7 is a diagram 700 of electronic data signals received and transmitted in an environment in which data signal enhancement device 210 operates. In some implementations, first merchant 124, and more specifically, merchant computing device 336 (e.g., a point of sale (POS) device), transmits an authorization request message 702 to payment processing server 202 (through acquirer 126) for the purchase of goods. Authorization request message 702 includes merchant transaction data 704. Subsequently, payment processing server 202 transmits a merchant transaction data signal 703 to data signal enhancement device 210. Merchant transaction data signal 703 includes merchant transaction data 704. Data signal enhancement device 210 detects merchant transaction data signal 703 and extracts merchant transaction data 704 from merchant transaction data signal 703.

Merchant transaction data 704 includes a merchant identifier 706, for example a name, code, or other unique identifier of merchant 124. Additionally, merchant transaction data 704 includes an address 708 of merchant location. Address 708 has a first format 710, for example a street address with an abbreviated street name, or an address that does not specify the full name of the city or state, and/or excludes zip code. Additionally, merchant transaction data 704 includes a cleanse field 712 that, in some implementations, is populated by payment processing server 202 and includes a "scrubbed" version of address 708, in which misspellings are corrected and/or specifies the location in another format, such as latitude and longitude coordinates. In some implementations, payment processing server 202 adds a location ID 713 to merchant transaction data 704. Location ID 713 is a code that uniquely identifies the merchant location (e.g., location 610) from which the authorization request message 702 originated.

Additionally, an ATM 612 transmits ATM data 714 to payment processing server 202, for example for use in processing a withdrawal or deposit to cardholder account 132. Payment processing server 202 transmits ATM data 714 to data signal enhancement device 210 in an ATM data signal 715. Data signal enhancement device 210 detects ATM data signal 715 and extracts ATM data 714 from ATM data signal 715. ATM data 714 includes an identifier 716 of ATM 612, for example a name or code that uniquely identifies ATM 612. Additionally, ATM data 714 includes an address 718 of ATM 612. Address 718 is in a second format 720 that differs from first format 710. For example, in some implementations, second format 720 includes the full name of the state, while first format 710 includes only an abbreviation of the state. In some implementations, second format 720 includes the zip code, while first format 710 excludes the zip code.

Data signal enhancement device 210 compares address 708 in first format 710 to address 718 in second format 720, for example using fuzzy logic, and determines that address 708 matches address 718. More specifically, data signal enhancement device 210 determines that address 708 and 718 specify the same location (e.g., first location 604). Further, data signal enhancement device 210 generates an indicator 722 that indicates that ATM 612 is collocated with merchant 124. More specifically, for example, data signal enhancement device 210 generates indicator 722 indicating that ATM 612 is located at first location 604 of merchant 124. Indicator 722 is described in more detail with reference to FIG. 8. In some implementations, data signal enhancement device 210 stores indicator 722 in memory, for example in database 208. In some implementations, data signal enhancement device 210 transmits indicator 722 to issuer 130. More specifically, in at least some implementations, data signal enhancement device 210 transmits an enhanced data signal 721 (e.g., an enhanced version of merchant transaction data signal 703), including indicator 722, to a computing device 324 of issuer 130. In some implementations, data signal enhancement device 210 does not receive ATM data 714 from payment processing server 202. Rather, in such implementations, computing device 324 of issuer 130 transmits ATM data 714 to data signal enhancement device 210, for example as part of a list of the ATMs associated with issuer 130, and their geographic locations.

Figure 8:
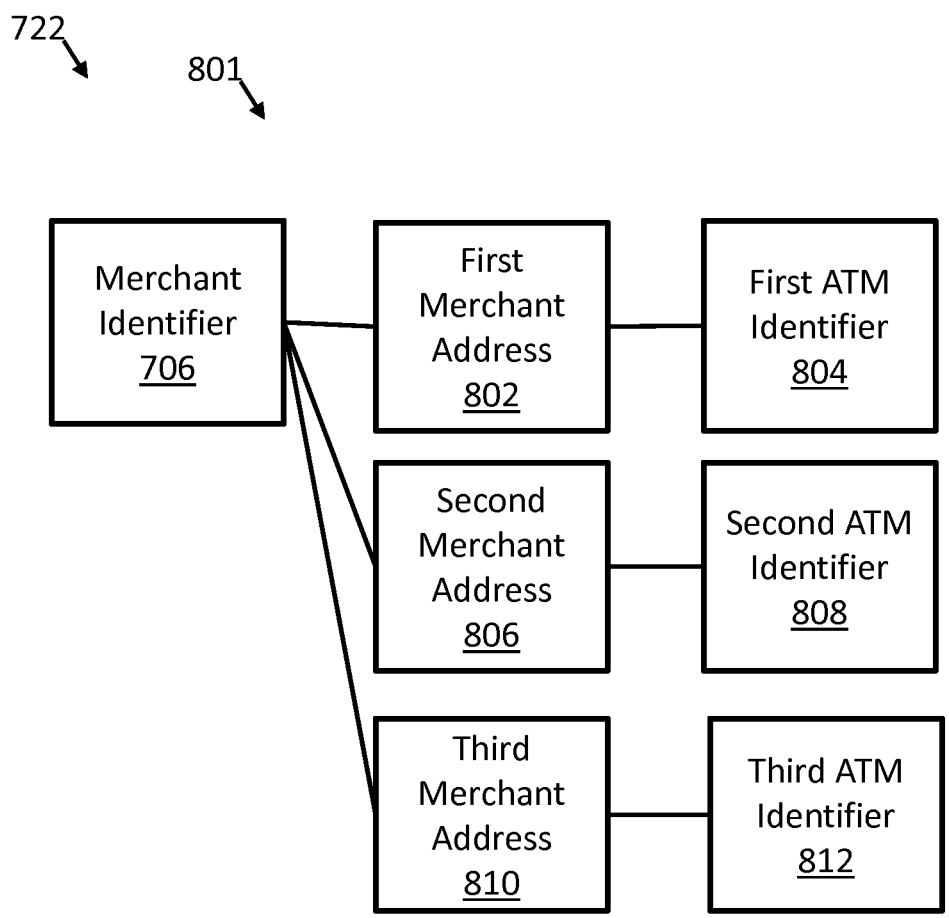

FIG. 8 is a diagram of indicator 722 generated by data signal enhancement device 210. In some implementations, data signal enhancement device 210 generates indicator as a tree 801, having a hierarchical format with links between data items, as described herein. Indicator 722 indicates that particular merchant locations include particular ATMs. More specifically, indicator 722 includes merchant identifier 706. Additionally, indicator 722 includes a first merchant address 802, for example address 708, address 718, or location ID 713. Additionally, indicator 722 includes a first ATM identifier 804, identifying ATM 612. For example, first ATM identifier 804 includes ATM identifier 716. If data signal enhancement device 210 has received merchant transaction data and ATM data corresponding to second location 606 of merchant 124 and second ATM 614, and/or merchant transaction data and ATM data corresponding to third location 608 of merchant 124 and third ATM 616, then data signal enhancement device 210 includes associations between these merchant locations and ATMs as well. More specifically, in some implementations, indicator 722 includes a second merchant address 806 identifying second location 606 and a second ATM identifier 808 that uniquely identifies second ATM 614. Further, in some implementations, indicator 722 includes a third merchant address 810 that identifies third location 608 and a third ATM identifier 812 that uniquely identifies third ATM 616. In other implementations, indicator 722 has a different structure than tree 801. In some implementations, indicator 722 is encoded in a markup language, for example extensible markup language (XML). In other implementations, indicator 722 is encoded in another format, such as a non-human-readable format (e.g., binary).

Figure 9:
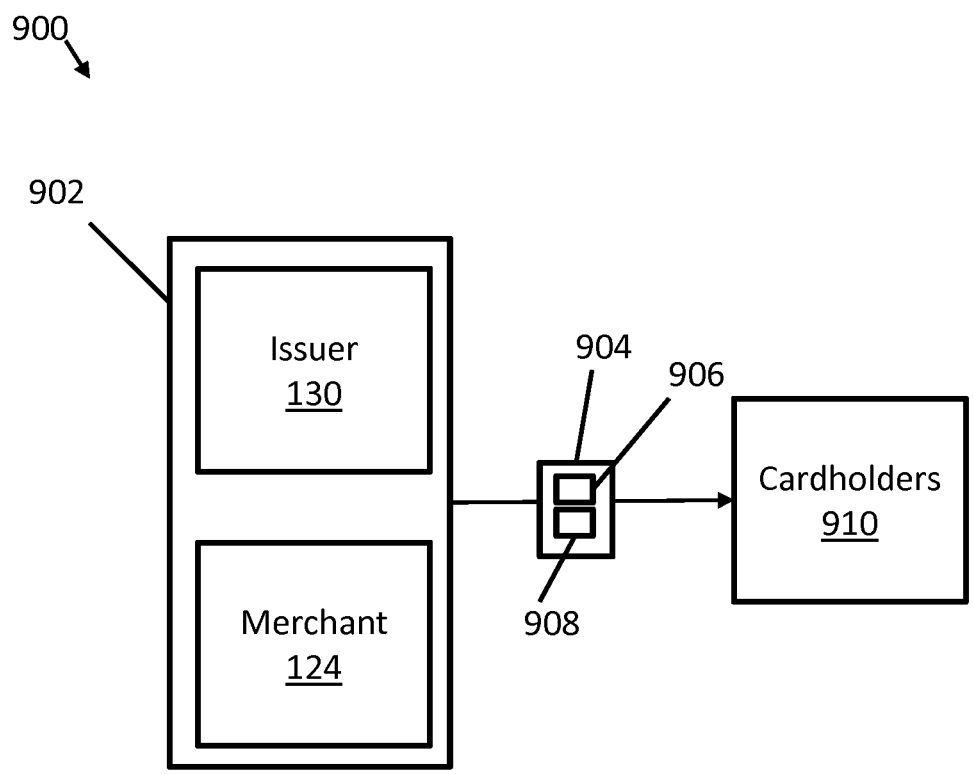

FIG. 9 is a diagram 900 that includes a message signal 904 transmitted from a message distributor 902 to a plurality of cardholders 910 (e.g., one or more cardholders 122) based at least in part on indicator 722 generated by the data signal enhancement device 210. More specifically, after receiving enhanced data signal 721 including indicator 722, issuer 130 cooperates with merchant 124, collectively acting as a message distributor 902 that transmits a message signal 904 (e.g., one or more advertisements) to cardholders 910. Message signal 904 includes a first reference 906 to the event 602 and a second reference 908 to merchant 124. For example message signal 904 suggests that cardholders 910 purchase pizza at a location (e.g., first location 604, second location 606, and/or third location 608) of merchant 124 on the day of event 602 because the locations 604, 606, and 608 are in geographic area 600 (FIG. 6), where event 602 will occur.

Figure 10:
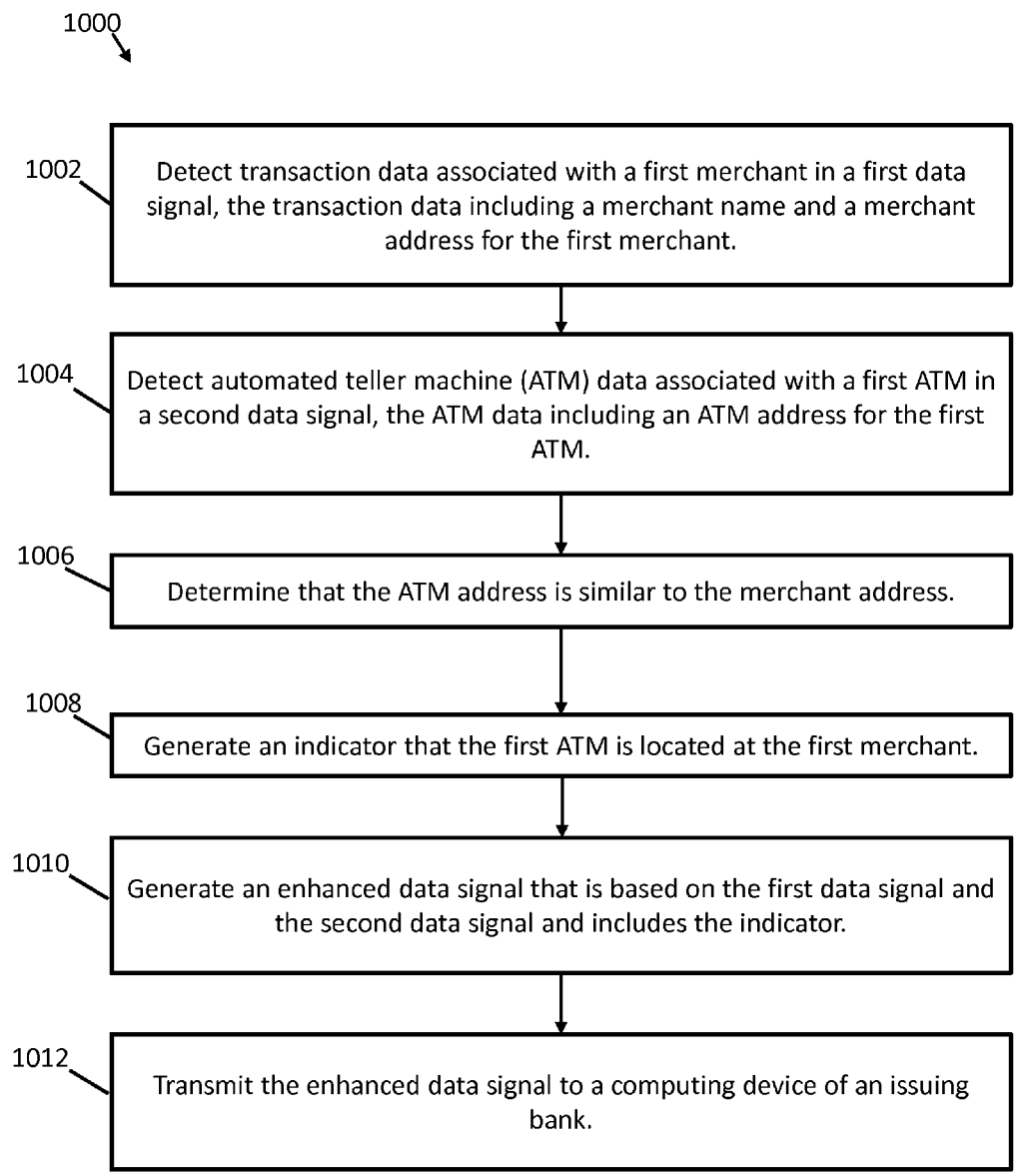

FIG. 10 is a flowchart of an example process 1000 implemented by data signal enhancement device 210 for enhancing data detected in a first data signal and a second data signal in one example embodiment of the present disclosure. Initially, data signal enhancement device 210 detects 1002 transaction data (e.g., merchant transaction data 704) associated with a first merchant (e.g., merchant 124) in a first data signal (e.g., merchant transaction data signal 703). The transaction data 704 includes a merchant name (e.g., merchant identifier 706) and a merchant address (e.g., address 708 for first location 604) for the first merchant (e.g., merchant 124). Additionally, data signal enhancement device 210 detects 1004 automated teller machine (ATM) data (e.g., ATM data 714) associated with a first ATM (e.g., first ATM 612) in a second data signal (e.g., ATM data signal 715). The ATM data (e.g., ATM data 714) includes an ATM address (e.g., address 718) for the first ATM (e.g., first ATM 612).

Additionally, data signal enhancement device 210 determines 1006 that the ATM address (e.g., address 718) is similar to (e.g., is at or within the merchant location) the merchant address (e.g., address 708). For example, in some implementations, first ATM 612 is physically located within a convenience store of a gas station (e.g., first merchant 124). In other implementations, first ATM 612 is located outside of, but in the parking lot of the convenience store of the gas station (e.g., first merchant 124). In other implementations, data signal enhancement device 210 determines that the ATM address 718 is similar to the merchant address 708 by determining that ATM address 718 is within a predefined radius (e.g., 200 feet) of merchant address 708. Further, data signal enhancement device 210 generates 1008 an indicator (e.g., indicator 722) that the first ATM (e.g., first ATM 612) is located at the first merchant 124 (e.g., at first location 604). Further, data signal enhancement device 210 generates 1010 an enhanced data signal (e.g., enhanced data signal 721) that is based on the first data signal (e.g., merchant transaction data signal 703) and the second data signal (e.g., ATM data signal 715) and includes the indicator (e.g., indicator 722). Additionally, data signal enhancement device 210 transmits 1012 the enhanced data signal to a computing device (e.g., computing device 324) of an issuing bank (e.g., issuer 130).

In some implementations, data signal enhancement device generates the indicator as a tree (e.g., tree 801) including a plurality of location identifiers associated with the first merchant, wherein each location identifier (e.g., first merchant address 802, second merchant address 806, and third merchant address 810) is associated with a respective one of a plurality of ATMs (e.g., first ATM 612, second ATM 614, and third ATM 616), including the first ATM (e.g., first ATM 612).

In some implementations, enhanced data signal 721 is an enhanced version of merchant transaction data signal 703. More specifically, in some implementations, enhanced data signal 721 includes the transaction data (e.g., merchant transaction data 704) in addition to indicator 722. In some implementations, the data signal enhancement device 210 detects the transaction data (e.g., merchant transaction data 704) in an authorization request message 702 generated by a computing device 336 associated with the first merchant 124 and received at the payment network (e.g., at payment processing server 202).

In some implementations, the data signal enhancement device 210 receives the merchant address (e.g., address 708) in a first format (e.g., first format 710) and receives the ATM address (e.g., address 718) in a second format (e.g., second format 720) that is different from the first format (e.g., first format 710). In some implementations, the data signal enhancement device 210 enhances the transaction data (e.g., merchant transaction data 704) by inserting the ATM address (e.g., address 718) into a cleanse field (e.g., cleanse field 712) of the transaction data (e.g., merchant transaction data 704). In such implementations, the merchant address (e.g., address 708) is in a first format (e.g., first format 710) and the ATM address (e.g., address 718) is in a second format (e.g., second format 720) that is different from the first format (e.g., first format 710).

In some implementations, data signal enhancement device 210 receives the ATM address (e.g., address 718) from a computing device (e.g., computing device 324) associated with an issuing bank (e.g., issuer 130). In some implementations, the data signal enhancement device 210 receives the ATM address (e.g., address 718) from a transaction initiated at the first ATM (e.g., first ATM 612).

Figure 11:
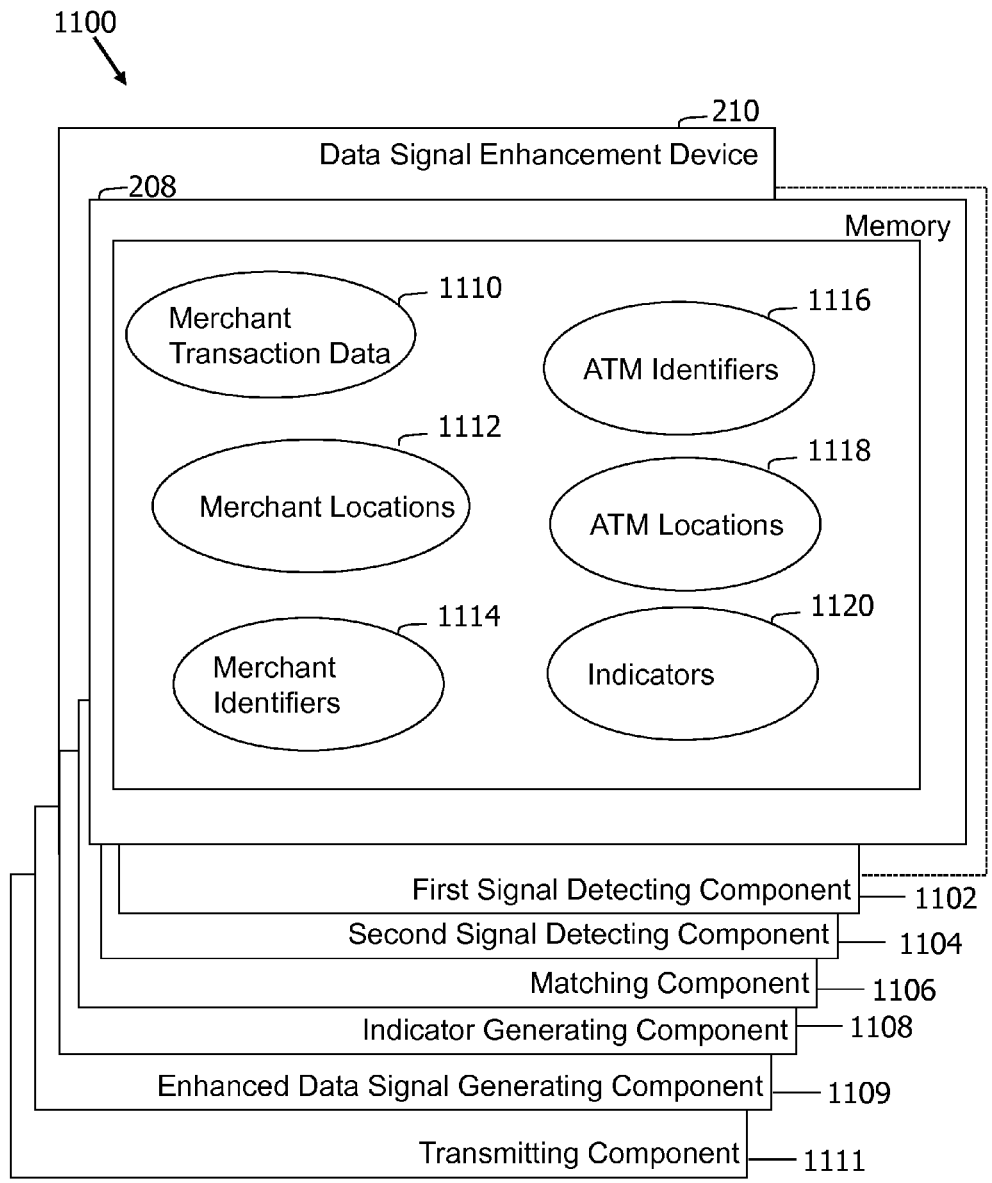

FIG. 11 is a diagram 1100 of components of one or more example computing devices, for example data signal enhancement device 210, that may be used in embodiments of the described systems and methods. FIG. 11 further shows a configuration of data in database 208. Database 208 is in communication with several separate components within data signal enhancement device 210, which perform specific tasks.

Data signal enhancement device 210 includes a first signal detecting component 1102 that detects transaction data associated with a first merchant in a first data signal. The transaction data includes a merchant name and a merchant address for the first merchant. Additionally, data signal enhancement device 210 includes a second signal detecting component 1104 that detects automated teller machine (ATM) data associated with a first ATM in a second data signal. The ATM data includes an ATM address for the first ATM. Additionally, data signal enhancement device 210 includes a matching component 1106 that determines that the ATM address is similar to the merchant address. Further, data signal enhancement device 210 includes an indicator generating component 1108 that generates an indicator that the first ATM is located at the first merchant. Additionally, data signal enhancement device 210 includes an enhanced data signal generating component 1109 that generates an enhanced data signal that is based on the first data signal and the second data signal and includes the indicator. Additionally, data signal enhancement device 210 includes a transmitting component 1111 that transmits the enhanced data signal to a computing device of an issuing bank.

In an example embodiment, data in database 208 is divided into a plurality of sections, including but not limited to, a merchant transaction data section 1110, a merchant locations section 1112, a merchant identifiers section 1114, an ATM identifiers section 1116, an ATM locations section 1118, and an indicators section 1120 that stores indicators similar to indicator 722, described above with reference to FIGS. 7 and 8. These sections stored in database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described systems and methods provide information to an issuer about which merchants the issuer's ATMs are located with. Accordingly, the systems and methods enable an issuer to coordinate with the merchants in anticipation of an event that will attract cardholders, and transmit messages to the cardholders to purchase products from the merchants housing the issuer's ATMs. By directing the cardholders to these particular merchant locations, not only will the merchant benefit from increased sales, the issuer will also benefit from increased usage of the issuer's ATMs. Additionally, the cardholders benefit by being directed to locations that sell products that the cardholders are interested in purchasing and that provide convenient access to an ATM.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A data signal enhancement device for adding supplemental location data to a data signal to enhance location determination, said data signal enhancement device comprises a processor coupled to a memory device, said data signal enhancement device is coupled to a processing network, said data signal enhancement device is configured to:
   detect transaction data associated with a first merchant in a first data signal received from the processing network, the transaction data including a merchant name and a merchant address for the first merchant, wherein the merchant address is in a first format;
   store the merchant name within a merchant identifiers section of the memory device and the merchant address within a merchant locations section of the memory;
   receive, from an automated teller machine (ATM) via the processing network, a second data signal including ATM data associated with a first ATM;
   detect the ATM data within the second data signal, the ATM data including an ATM address for the first ATM, wherein the ATM address is in a second format different from the first format;
   retrieve, from the merchant locations section, the merchant address;
   compare, using fuzzy logic, the merchant address in the first format to the ATM address in the second format;
   determine that the ATM address is similar to the merchant address based on a result of the comparison, wherein the result includes at least one of i) a match between the ATM address and the merchant address and ii) a determination that the ATM address is within a predefined radius of the merchant address;
   generate an indicator that the first ATM is located at the first merchant;
   generate an enhanced data signal that is based on the first data signal and the second data signal and includes the indicator, the enhanced data signal indicating that the first ATM is located at the merchant address; and
   transmit the enhanced data signal to a computing device of an issuing bank.

2. The data signal enhancement device of claim 1, further configured to generate the indicator as a tree including a plurality of location identifiers associated with the first merchant, wherein each location identifier is associated with a respective one of a plurality of ATMs, including the first ATM.

3. The data signal enhancement device of claim 1, further configured to detect the transaction data in an authorization request message generated by a computing device associated with the first merchant and received at the processing network.

4. The data signal enhancement device of claim 1, further configured such that: receiving the transaction data includes receiving the merchant address in a first format; and receiving the ATM data includes receiving the ATM address in a second format that is different from the first format.

5. The data signal enhancement device of claim 1, further configured to enhance the transaction data by inserting the ATM address into a cleanse field of the transaction data, wherein the merchant address is in a first format and the ATM address is in a second format that is different from the first format.

6. The data signal enhancement device of claim 1, further configured to receive the ATM address from a computing device associated with an issuing bank.

7. The data signal enhancement device of claim 1, further configured to receive the ATM address from a transaction initiated at the first ATM.

8. A method for adding supplemental location data to a data signal to enhance location determination, said method is implemented by a data signal enhancement device coupled to a memory device and to a processing network, said method comprising:
   detecting, by the data signal enhancement device, transaction data associated with a first merchant in a first data signal received from the processing network, the transaction data including a merchant name and a merchant address for the first merchant, wherein the merchant address is in a first format;
   storing, by the data signal enhancement device, the merchant name within a merchant identifiers section of the memory device and the merchant address within a merchant locations section of the memory;
   receiving, by the data signal enhancement device from an automated teller machine (ATM) via the processing network, a second data signal including ATM data associated with a first ATM;
   detecting, by the data signal enhancement device, the ATM data within the second data signal, the ATM data including an ATM address for the first ATM, wherein the ATM address is in a second format different from the first format;
   retrieving, by the data signal enhancement device from the merchant locations section, the merchant address;
   comparing, by the data signal enhancement device using fuzzy logic, the merchant address in the first format to the ATM address in the second format;

determining, by the data signal enhancement device, that the ATM address is similar to the merchant address based on a result of the comparison, wherein the result includes at least one of i) a match between the ATM address and the merchant address and ii) a determination that the ATM address is within a predefined radius of the merchant address;

generating, by the data signal enhancement device, an indicator that the first ATM is located at the first merchant;

generating, by the data signal enhancement device, an enhanced data signal that is based on the first data signal and the second data signal and includes the indicator, the enhanced data signal indicating that the first ATM is located at the merchant address; and transmitting, by the data signal enhancement device, the enhanced data signal to a computing device of an issuing bank.

9. The method of claim 8, further comprising generating the indicator as a tree including a plurality of location identifiers associated with the first merchant, wherein each location identifier is associated with a respective one of a plurality of ATMs, including the first ATM.

10. The method of claim 8, further comprising detecting the transaction data in an authorization request message generated by a computing device associated with the first merchant and received at the processing network.

11. The method of claim 8, wherein: receiving the transaction data includes receiving the merchant address in a first format; and receiving the ATM data includes receiving the ATM address in a second format that is different from the first format.

12. The method of claim 8, further comprising enhancing the transaction data by inserting the ATM address into a cleanse field of the transaction data, wherein the merchant address is in a first format and the ATM address is in a second format that is different from the first format.

13. The method of claim 8, further comprising receiving the ATM address from a computing device associated with an issuing bank.

14. The method of claim 8, further comprising receiving the ATM address from a transaction initiated at the first ATM.

15. A non-transitory computer-readable storage medium having computer-executable instructions embodied thereon, wherein when executed by one or more processors of a data signal enhancement device coupled to a memory device and to a processing network, the computer-executable instructions cause the data signal enhancement device to:

detect transaction data associated with a first merchant in a first data signal received from the processing network, the transaction data including a merchant name and a merchant address for the first merchant, wherein the merchant address is in a first format;

store the merchant name within a merchant identifiers section of the memory device and the merchant address within a merchant locations section of the memory;

receive, from an automated teller machine (ATM) via the processing network, a second data signal including ATM data associated with a first ATM;

detect the ATM data within the second data signal, the ATM data including an ATM address for the first ATM, wherein the ATM address is in a second format different from the first format;

retrieve, from the merchant locations section, the merchant address;

compare, using fuzzy logic, the merchant address in the first format to the ATM address in the second format;

determine that the ATM address is similar to the merchant address based on a result of the comparison, wherein the result includes at least one of i) a match between the ATM address and the merchant address and ii) a determination that the ATM address is within a predefined radius of the merchant address;

generate an indicator that the first ATM is located at the first merchant;

generate an enhanced data signal that is based on the first data signal and the second data signal and includes the indicator, the enhanced data signal indicating that the first ATM is located at the merchant address; and transmit the enhanced data signal to a computing device of an issuing bank.

16. The computer-readable storage medium of claim 15, wherein said computer-readable instructions additionally cause the data signal enhancement device to generate the indicator as a tree including a plurality of location identifiers associated with the first merchant, wherein each location identifier is associated with a respective one of a plurality of ATMs, including the first ATM.

17. The computer-readable storage medium of claim 15, wherein said computer-readable instructions additionally cause the data signal enhancement device to detect the transaction data in an authorization request message generated by a computing device associated with the first merchant and received at the processing network.

18. The computer-readable storage medium of claim 15, further comprising computer-readable instructions such that: receiving the transaction data includes receiving the merchant address in a first format; and receiving the ATM data includes receiving the ATM address in a second format that is different from the first format.

19. The computer-readable storage medium of claim 15, wherein said computer-readable instructions additionally cause the data signal enhancement device to enhance the transaction data by inserting the ATM address into a cleanse field of the transaction data, wherein the merchant address is in a first format and the ATM address is in a second format that is different from the first format.

20. The computer-readable storage medium of claim 15, wherein said computer-readable instructions additionally cause the data signal enhancement device to receive the ATM address from a computing device associated with an issuing bank.

* * * * *